May 13, 1924.
S. S. MIMS
APPARATUS FOR TREATING VEGETABLES
Filed Jan. 9, 1923   3 Sheets-Sheet 3
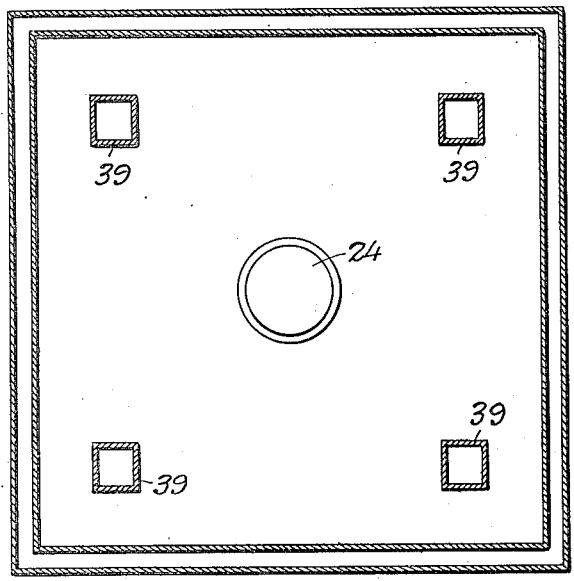
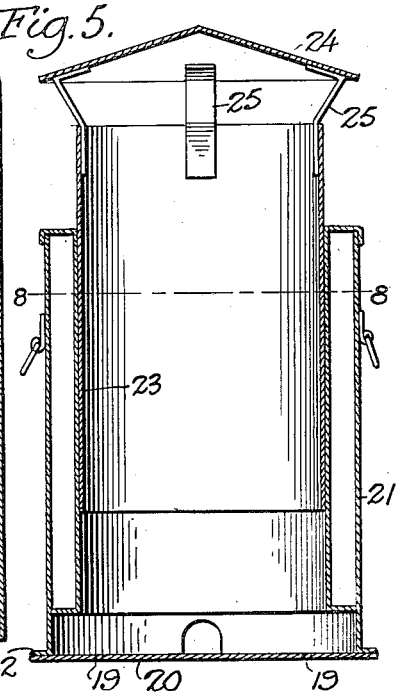
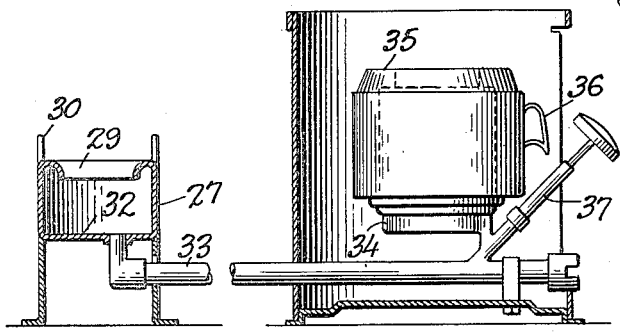
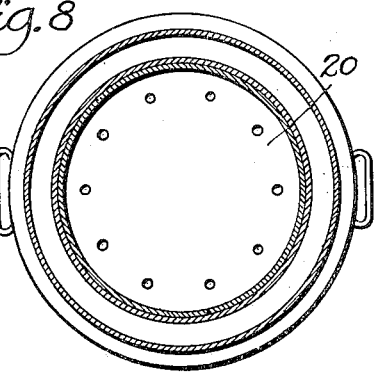
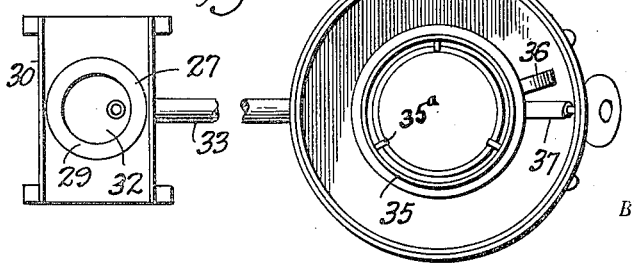
INVENTOR.
Samuel S. Mims
BY
ATTORNEY.

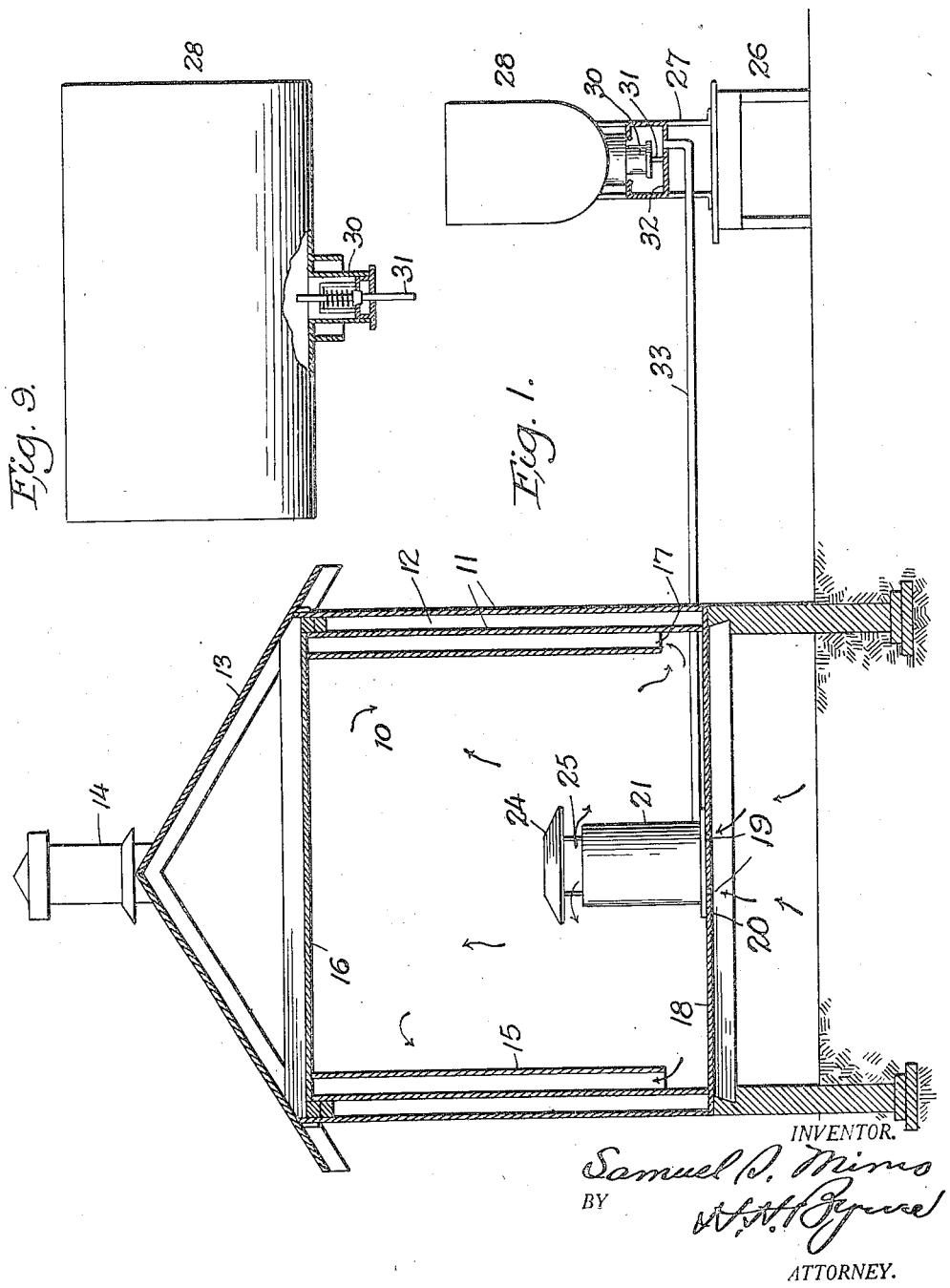

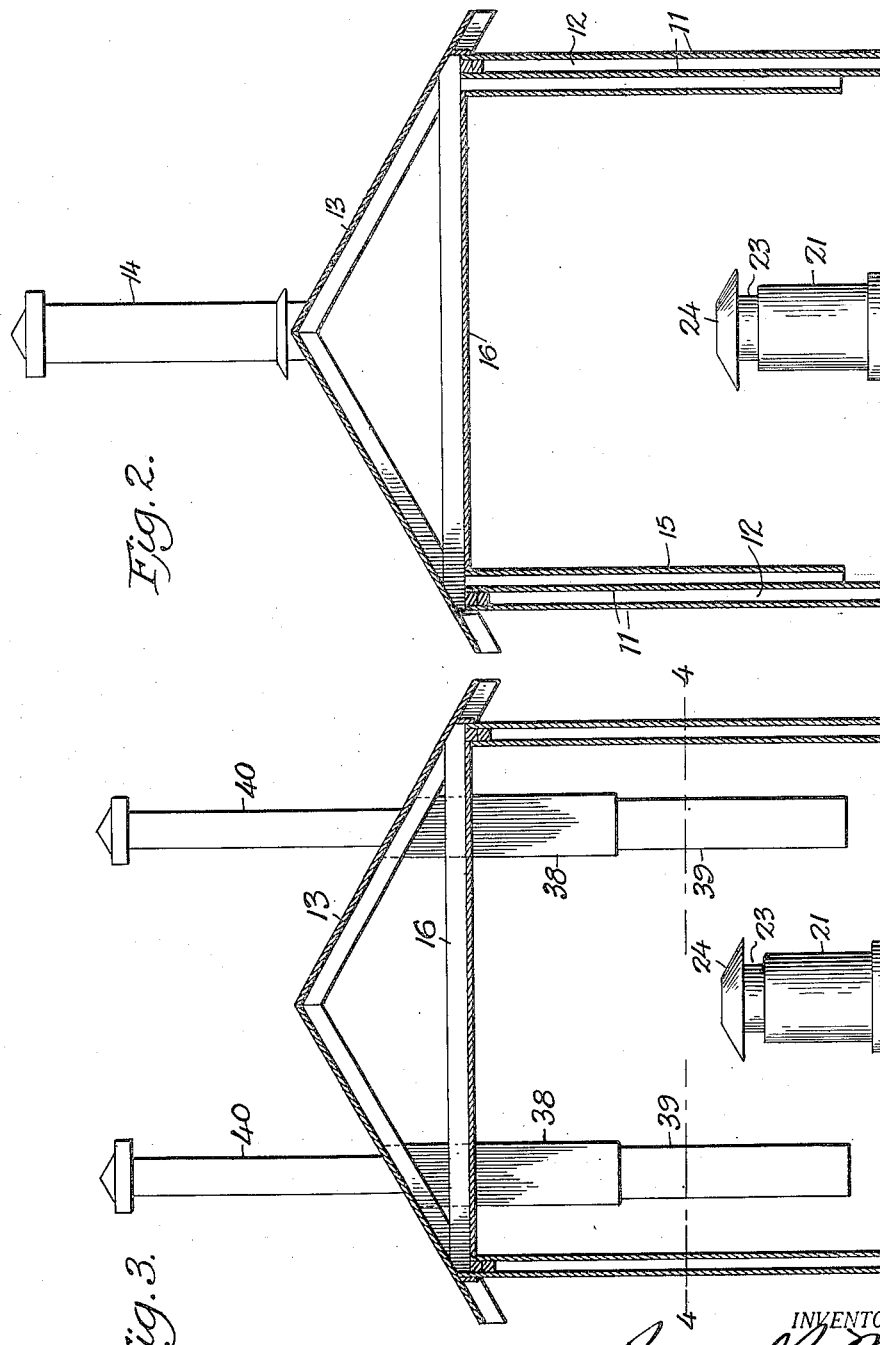

Patented May 13, 1924.

1,493,889

UNITED STATES PATENT OFFICE.

SAMUEL S. MIMS, OF HOUSTON, TEXAS, ASSIGNOR OF ONE-HALF TO HENRY C. BURT, OF HOUSTON, TEXAS.

APPARATUS FOR TREATING VEGETABLES.

Application filed January 9, 1923. Serial No. 611,608.

*To all whom it may concern:*

Be it known that I, SAMUEL S. MIMS, a citizen of the United States, residing at Houston, in the county of Harris and State of Texas, have invented certain new and useful Improvements in Apparatus for Treating Vegetables, of which the following is a specification.

The present invention relates to a method of, and an apparatus for, treating or processing sweet potatoes, other vegetables, fruits, hay, tobacco, etc. to the action of carbon monoxide and carbon dioxide and other gases generated through the process herein described, also treating the same at the desired temperature and with dried air, and consists in the steps of procedure and combinations and arrangements of parts of apparatus hereinafter described and particularly set forth in the accompanying claims.

The invention has for its purpose to provide a novel form of apparatus in combination with a suitable furnace and fuel burner constructed and arranged to cause an incoming flow of air from the atmosphere to be heated and deoxidized, thereby producing gases, principally carbon monoxide and carbon dioxide gases, which are liberated at the desired temperature and with heated air, to act upon sweet potatoes, other vegetables, fruits, hay or other material to be treated for the removal of fungi, and for the purpose of curing or processing said products.

A further purpose of the invention is to produce an apparatus to accomplish these ends, which is of simple construction, inexpensive to produce, and economical in its operation.

The method and apparatus herein disclosed are designed primarily for treating sweet potatoes, but other vegetables and fruits may be treated without in any way deteriorating the same. The treatment may also be effectively used on hay, tobacco or other plant life for drying and processing the same, or destroying any deteriorating fungi with which it may be afflicted.

The invention is disclosed by way of illustration in the accompanying drawings, wherein:

Figure 1 is a longitudinal sectional view partly in elevation, of the apparatus as erected for operation, Figure 2 a vertical sectional view of the heating channel shown in Figure 1, Figure 3 a similar view of a modified construction thereof, Figure 4 a floor plan of the chamber shown in Figure 3, Figure 5 a vertical sectional view through the furnace, Figure 6 a sectional view through the burner and the fuel tank support, Figure 7 a top plan view of the burner and tank support, Figure 8 a horizontal sectional view thereof taken on the line 8—8 of Figure 5, and Figure 9 a detailed view of the fuel tank, showing the automatically operated fuel controlling valve.

Referring to the construction in further detail and wherein like reference characters designate corresponding parts in the different figures, the apparatus comprises essentially a fuel burner or heating unit, a fuel reservoir located in feeding relation thereto, and a container or housing providing the treating chamber for the produce or other material to be acted upon.

The treating chamber 10 is provided by a suitable structure or housing formed of side walls 11 having the space 12 therebetween providing a surrounding dead air enclosure which affords the necessary insulation. A roof 13 of any suitable kind is provided, but preferably the pyramidal type as shown. The volume of the treating chamber may obviously be decided upon at will.

A ventilator or chimney 14 of any suitable type is mounted on the apex of the roof, and a false wall 15 is dependingly supported from the roof 16, and extends entirely around the treating chamber at a distance of approximately four inches from the inner surface of the side walls 11. The lower edge 17 of the false wall is raised about ten inches from the floor 18 of the housing to provide an exit for the escape of the treating gases, such gases in their action taking substantially the directions indicated by the arrows shown in Figure 1.

The flooring 18 of the housing is provided with a series of apertures 19 annularly arranged and immediately thereover is a plate 20 likewise apertured to register with the apertures 19 for the purpose of admitting atmospheric air into the treating chamber. Said plate 20 is adapted to be angularly adjusted for the purpose of regulating the extent of air openings, or entirely closing off the openings to exclude all air as desired.

The heater or furnace consists of a double walled section or casing 21 having its lower outer edge flanged as at 22 to provide a supporting surface resting directly on the perforated plate 20 as clearly shown in Figures 1 and 5. An inner section 23 has a telescoping fit within the inner wall of the section 21 and is adapted to be adjusted therein for the purpose of regulating the temperature of the heated gases and the liberation thereof as will be understood. A conical like top 24 is secured to the upper end of the telescoping section 23 by the spaced supports 25 providing the necessary exhaust for the escape of the heated gases.

The heater is adapted to be located centrally of the treating chamber as shown in Figure 1.

The source of fuel supply is located at an appreciable distance from the housing and consists of a suitable structure 26 supporting a saddle like holder 27 having substantially the details of construction shown in Figures 6 and 7. A fuel tank 28 is on the holder and retained in position thereon by the flanged portions 29 and 30 as shown. The tank is provided with a spring seated valve 31 (see Figure 9) adapted to be closed when the tank is removed from the support 27, but opened to permit the flow of the fuel when said tank is placed in position upon said support. This automatic opening of the valve is effected by the projecting valve stem 31 contacting with the plate portion 32 of the support 27. A pipe 33 connects the fuel reservoir 28 with the burner per se of the heater.

A burner 34 is suitably mounted within the heater as illustrated in Figure 6 and a chimney 35 is supported on the burner by means of the radially projecting lugs 35ª, and a handle 36 is provided for conveniently removing or replacing the chimney. A needle valve 37 of any approved type is provided for regulating the amount of fuel delivered to the burner.

The construction of the housing disclosed in Figure 3 is, in all essential respects, the same as that shown in Figures 1 and 2 above described. This arrangement (i. e. Figure 3) is characterized by having a plurality of ventilators, or outlet passages located preferably at the four corners of the housing. Each of said ventilators consists of a pipe section 38 fixed to the roof portions 13 and 16 and an adjustable portion 39 telescoping within the portion 38. An outlet pipe 40 leading to the atmosphere communicates with each of the ventilator sections 38. The purpose of these several outlet pipes is to permit liberation of the cooled carbon monoxide or carbon dioxide gases after the same have settled to the lower portions of the treating chamber 10 as will be understood.

The purpose of placing the fuel tank outside and away from the storage house is to obtain the minimum rate of insurance, and endeavor to make accident by fire from the oil or the furnace practically impossible: Also for the further purpose of making it unnecessary to open the door of the storage house during the drying, processing, or curing operation and thereby not admitting any cold or moisture-laden air.

In the operation of the system the warm air and gaseous fumes are spread or diffused by the top of the telescoping section of the burner, and hence thoroughly spread to all parts of the treating chamber, taking substantially the direction indicated by the arrows in Figure 1. The poisonous quality of these gases distributed by convection acts to destroy any fungus growth with which the produce or other material may be thus affected and it may be further noted that the produce thus treated will be dried and relieved of its excess moisture, thereby conditioning the same for shipment to distant points without deterioration.

It is obvious that those skilled in the art may vary the steps in the carrying out of the process, or the details of construction and arrangement of parts of the apparatus without departing from the spirit of our invention, and, therefore, I do not wish to be limited to such features except as may be required by the claims.

Having thus described my invention, what is claimed as new is:—

1. An apparatus of the character described comprising a housing for the material to be treated, said housing having a perforated flooring for admitting atmospheric air, and a fuel burner located immediately over the perforations of the flooring for heating the admitted air, substantially as set forth.

2. An apparatus of the character described comprising a housing for the material to be treated, said housing having an inner false wall at the sides thereof with its lower edge spaced from the flooring of the housing providing a circuitous traversing path for the treating gases and a fuel burner located in the housing substantially as set forth.

3. An apparatus of the character described comprising a housing for the material to be treated, said housing having a perforated flooring and an inner false wall at the sides thereof with its lower edge spaced from the flooring of the housing providing a circuitous traversing path for the treating gases, and a fuel burner located immediately over the perforations of the flooring for heating the admitted air, substantially as set forth.

4. The combination with a housing providing a chamber for treating products of vegetation, of a fuel burner located therein for generating the treating gases, said burner having a casing providing a surrounding dead air space, and provided with a telescoping section through which the generated gases are liberated, substantially as set forth.

In testimony whereof I affix my signature.

SAMUEL S. MIMS.